United States Patent [19]

Karube et al.

[11] Patent Number: 5,065,330
[45] Date of Patent: Nov. 12, 1991

[54] NUMERICAL CONTROL SYSTEM FOR LASER

[75] Inventors: Norio Karube, Machida; Mitsuo Manabe, Hachioji, both of Japan

[73] Assignee: Fanuc Ltd, Minamitsuru, Japan

[21] Appl. No.: 363,393

[22] PCT Filed: Apr. 28, 1988

[86] PCT No.: PCT/JP88/00428

§ 371 Date: Nov. 30, 1988

§ 102(e) Date: Nov. 30, 1988

[87] PCT Pub. No.: WO88/08355

PCT Pub. Date: Nov. 3, 1988

Related U.S. Application Data

[63] Continuation-in-part of Ser. No. 283,472, Nov. 30, 1988, abandoned.

[30] Foreign Application Priority Data

Apr. 30, 1987 [JP] Japan .................... 62-107829

[51] Int. Cl.[5] .................... G06F 15/46; B23K 26/00
[52] U.S. Cl. .................... 364/474.08; 219/121.62; 219/121.82; 219/121.83
[58] Field of Search .................... 364/474.08, 474.22, 364/474.28, 474.35; 219/121.82, 121.61, 121.62, 121.78, 121.79, 121.81, 121.85

[56] References Cited

U.S. PATENT DOCUMENTS

| | | | |
|---|---|---|---|
| 4,547,855 | 10/1985 | Lanyi et al. | 364/474.08 |
| 4,555,610 | 11/1985 | Pocad et al. | 364/474.08 X |
| 4,587,396 | 5/1986 | Rubin | 219/121.82 X |
| 4,626,999 | 12/1986 | Bannister | 364/474.08 |
| 4,698,480 | 10/1987 | Klingel | 364/474.08 X |

Primary Examiner—Joseph Ruggiero
Attorney, Agent, or Firm—Staas & Halsey

[57] ABSTRACT

A numerical control system for a laser comprises a laser oscillator (1), an electric power supply (3) for driving the laser oscillator, and a computerized numerical control system (CNC) (5). The numerical control system includes sequence control means for controlling a sequence of operation of the laser oscillator, output control means for controlling output conditions of the laser oscillator feedback control means for controlling the feedback of an output from the laser oscillator, and display control means for displaying a condition of the laser oscillator. The laser oscillator (1), the power supply (3), and the computerized numerical control system (5) are coupled together, making the numerical control system for the laser small in size and simple in arrangement.

5 Claims, 5 Drawing Sheets ical control system for a material processing apparatus comprising a computerized numerical control system (CNC) and a laser oscillator which are coupled to each other.

NUMERICAL CONTROL SYSTEM FOR LASER

This is a continuation-in-part of co-pending application Ser. No. 07/283,/472 filed on Nov. 30, 1988, abandoned.

CROSS REFERENCE TO RELATED APPLICATIONS

This application is related to the following copending applications assigned to the same assignee as this application:
1. U.S. Ser. No. 07/283.325 filed Dec. 5, 1988;
2. U.S. Ser. No. 07/273,520 filed Nov. 3, 1988, U.S. Pat. No. 4,890,291;
3. U.S. Ser. No. 07/283,479 filed Dec. 5, 1988, U.S. Pat. No. 4,930,135;
4. U.S. Ser. No. 07/295,203 filed Dec. 20, 1988, U.S. Pat. No. 4,887,272.
5. U.S. Patent Application entitled: LASER OSCILLATOR DEVICE, U.S. Ser. No. 07/298,745, U.S. Pat. No. 4,935,933 filed Jan. 12, 1989.

TECHNICAL FIELD

The present invention relates to a material processing high-output laser oscillator, and more particularly to a numerical control system for a material processing apparatus comprising a computerized numerical control system (CNC) and a laser oscillator which are coupled to each other.

BACKGROUND ART

A computerized numerical control system and a laser oscillator are coupled to each other to provide a numerically controlled material processing apparatus for carrying out more complex machining at high speed and with high accuracy.

FIG. 2 shows a control system for a laser oscillator and a work table of a conventional laser material processing apparatus. The laser oscillator, denoted at 1, is energized by a power supply 3 which supplies its output through a power supply cable 11 to the laser oscillator 1. In the laser oscillator 1, various devices such as a gas regulator which require sequence control are controlled by a programmable controller (PC) 2. The cable 9 transmits signals between the programmable controller 2 and the laser oscillator 1. The programmable controller 2 controls not only the laser oscillator 1, but also the power supply 3. An output laser beam from the laser oscillator 1 passes through a beam guide 6 to a beam focusing system 7 by which the output laser beam is converged onto a workpiece 8. The workpiece 8 is fixedly mounted on a work table 4 that is controlled by a computerized numerical control system (CNC) 5.

The conventional system as described above has the following problems:

The first problem is that the entire apparatus is large in size and complex and its components are separated. Therefore, its installation and maintenance are timeconsuming, and the space factor thereof is bad.

The second problem is that the data processing abilities of the computerized numerical control system 5 and the laser oscillator 1 or the power supply 3 are not balanced, and complex control of the laser oscillator 1 cannot be performed by the power supply 3.

The third drawback is that as the programmable controller 2 and the computerized numerical control system 5 have electrically common portions, the redundancy is high and the arrangement is not economical.

SUMMARY OF THE INVENTION

It is an object of the present invention to provide a material processing apparatus which will solve the above problems and which is small in size, of high performance, and economical.

To solve the aforesaid problems, there is provided in accordance with the present invention a numerical control system for a laser comprising a laser oscillator, an electric power supply for driving the laser oscillator, and a computerized numerical control system (CNC), comprising: sequence control means for controlling a sequence of operation of the laser oscillator; output control means for controlling output conditions of said laser oscillator; feedback control means for controlling the feedback of an output from the laser oscillator; display control means for displaying a condition of the laser oscillator; and table movement control means for controlling the position and speed of a work table, all of these means being controlled together.

By effecting sequence control, output control, feedback control, display control, and table control together, the numerical control system for the laser is made small in size and in high performance.

DESCRIPTION OF THE PREFERRED EMBODIMENT

An embodiment of the present invention will hereinafter be described in specific detail with reference to the drawings.

Figure 1:
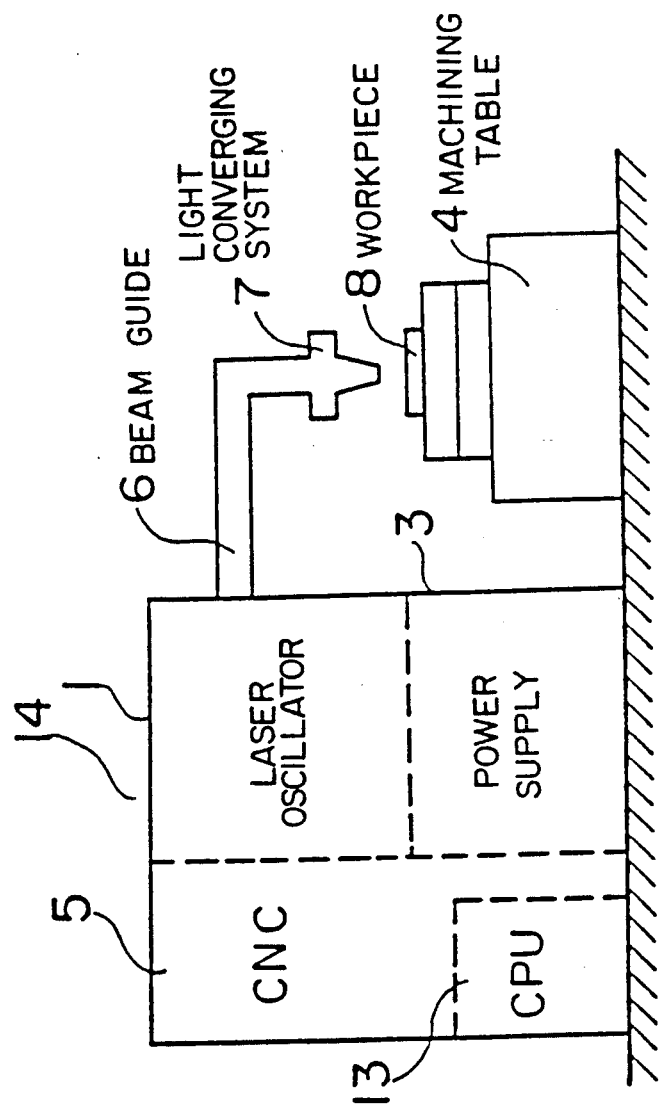
FIG. 1 is a block diagram of an embodiment of the present invention.
Figure 2:
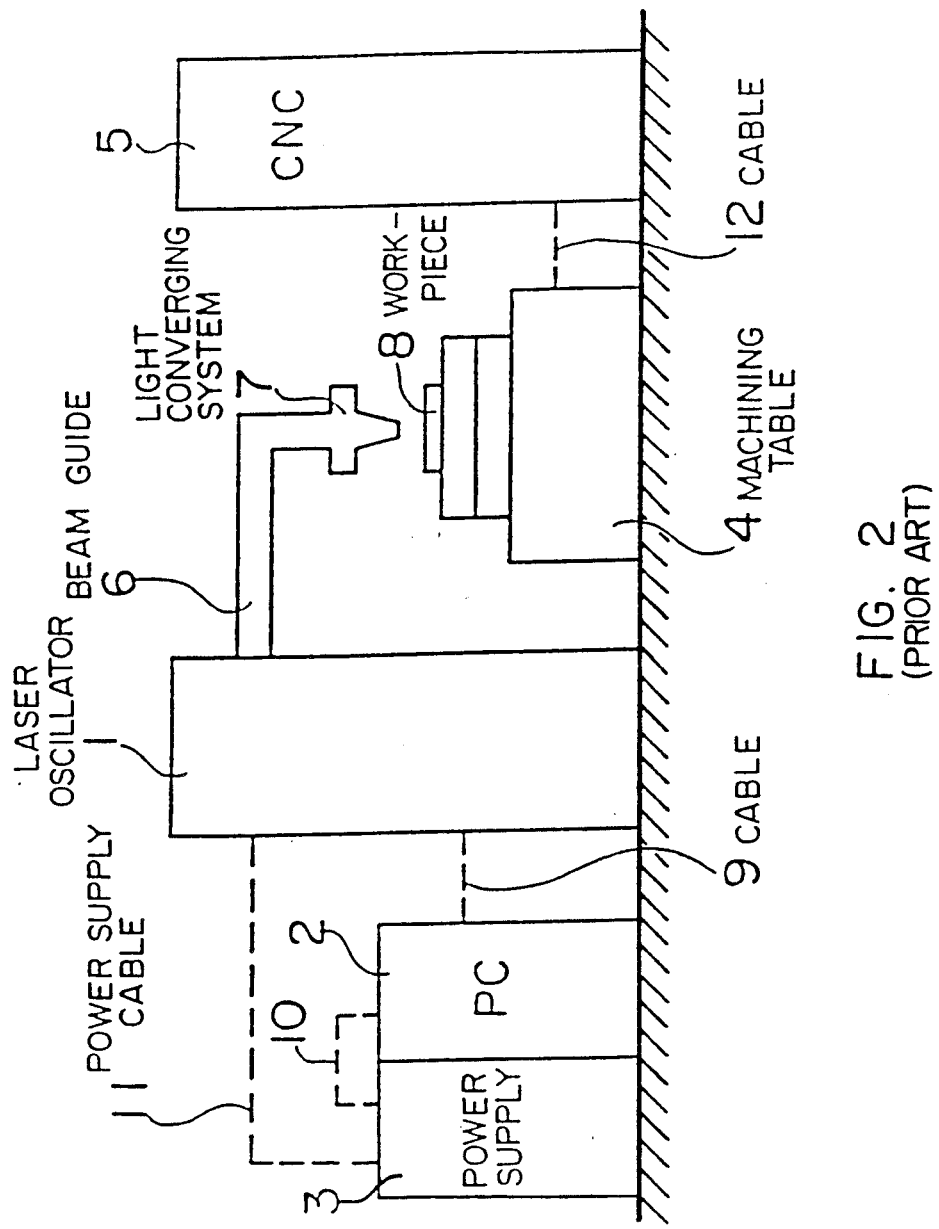
FIG. 2 is a view showing the arrangement of a conventional material processing apparatus.

FIG. 1 is a block diagram of an embodiment of the present invention. Those parts in FIG. 1 which are identical to those of FIG. 2 are denoted by the identical reference numerals. In FIG. 1, a laser oscillator 1, an electric power supply 3, and a computerized numerical control system (CNC) are put together in one housing and coupled to each other. The unitary assembly of the laser oscillator 1, the power supply 3, and the computerized numerical control system (CNC) is referred to as "NC laser". A laser material processing apparatus comprises the NC laser and a work table (machine-side structure), and the overall arrangement is simplified. While the laser oscillator 1, the electric power supply 3, and the computerized numerical control system (CNC) 5 are assembled in one housing in this embodiment, the present invention is not limited to such an arrangement, but it is essential for the present invention that these three components be coupled without functional redundancy. In the "NC laser", the computerized numerical control system (CNC) 5 is in the form of a microprocessor, and various functions are software-implemented by a CPU 13 in the computerized numerical control system (CNC) 5. Since the hardware of these components is well known, the description of the hardware is omitted here.

Figure 3:
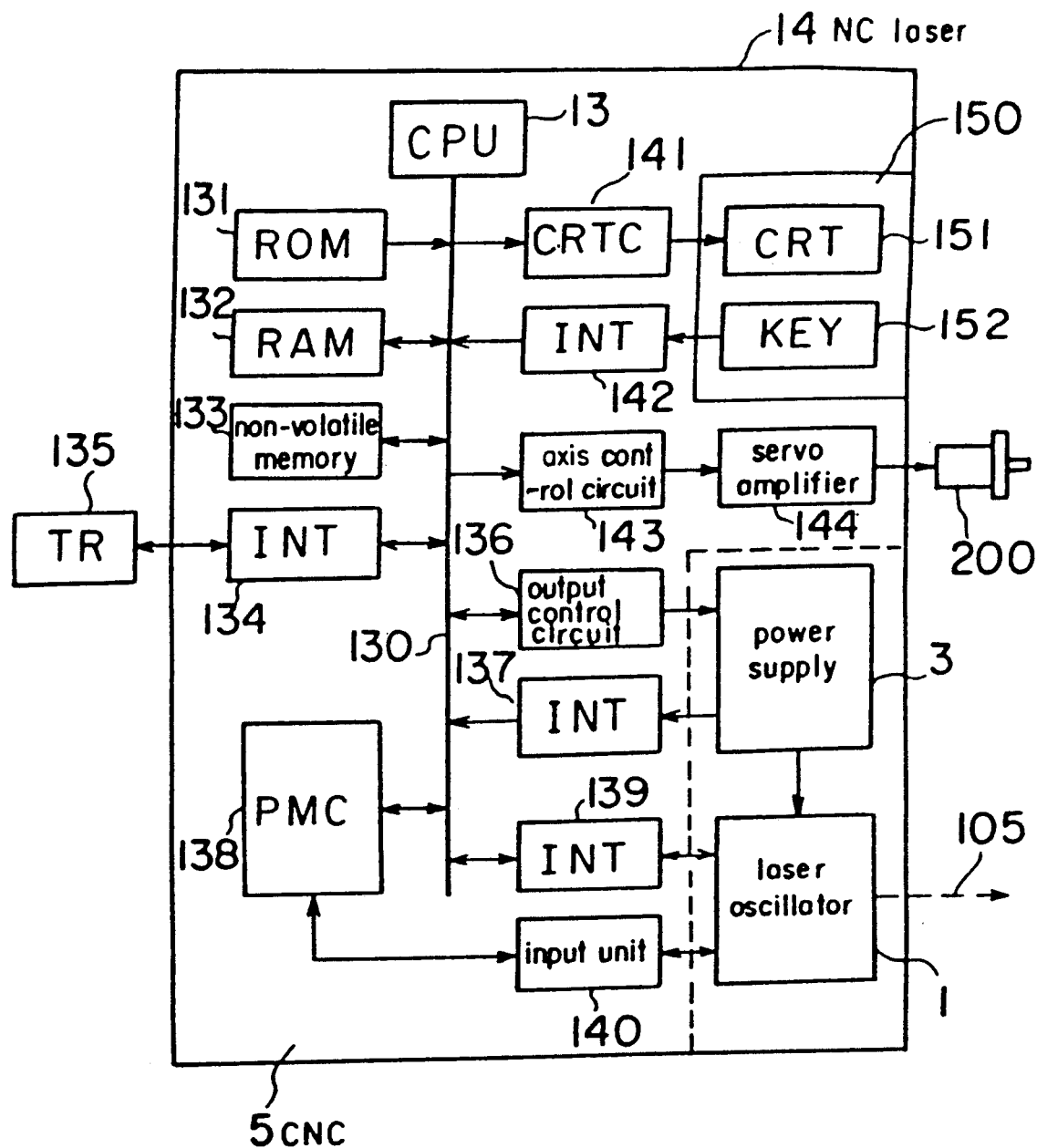
FIG. 3 is a block diagram of the inside arrangement of the NC laser shown in FIG. 1.

FIG. 3 is a block diagram of the inside arrangement of the NC laser 14, wherein the processor 13 in the computerized numerical control system (CNC) 5 reads a system program stored in a ROM 131 via a bus 130 and controls the overall operation of the NC laser 14 according to the system program. A RAM 132 comprises a dynamic RAM (DRAM) a stores temporary calculation data, display data and the like. A non-volatile memory 133 comprises a CMOS memory backed up by a battery and stores a machining program and various parameters.

An interface 134 is used for interface with external devices to which external devices 135 such a a paper tape reader, a paper tape puncher, a paper tape reader/-puncher are connected. A machining program can be read from the paper tape reader and a machining program edited in the computerized numerical control system (CNC) 5 can be output to the paper tape puncher.

An output control circuit 136 converts an output command value commanded by the processor 13 to a current command value and outputs the same to control the output current from the power supply 3. Various signals in the power supply 3 are applied to the processor 13 through an interface 137.

A programmable machine controller (PMC) 138 is connected within the computerized numerical control system (CNC) 5 and controls the laser oscillator 1 using a sequence program created in a ladder type form. More specifically, the sequence program generates the necessary signal by driving the laser oscillator 1 in accordance with a command of the machining program and applied to the laser oscillator 1 via input unit 140. Further, various signals in the laser oscillator 1 are read through an interface 139.

A graphic control circuit 141 converts various kinds of digital image data to an image signal and outputs the same. This image signal is transmitted to a display 151 of a CRT/MDI unit 150 and displayed. An interface 142 receives data from a keyboard 152 in the CRT/MDI unit 150 and applies the same to the processor 13.

An axis control circuit 143 receives a shift command for each axis from the processor 13 and converts it to a speed command signal and outputs this signal to a servo amplifier 144. The servo amplifier 144 amplifies the speed command signal and drives a servo motor 200 of a machining table 4 (FIG. 1). The servo motor 200 includes a position detecting pulse coder which generates a position signal that is fed back as a pulse train. The pulse train is subject to, for example, F/V conversion (frequency to velocity conversion) in order to generate a speed signal. The feedback circuit of the position signal and the velocity feedback circuit are not shown in FIG. 3. although an axis control system for a single axis is shown in FIG. 3, there are actually a plurality of axis control systems.

Figure 4:
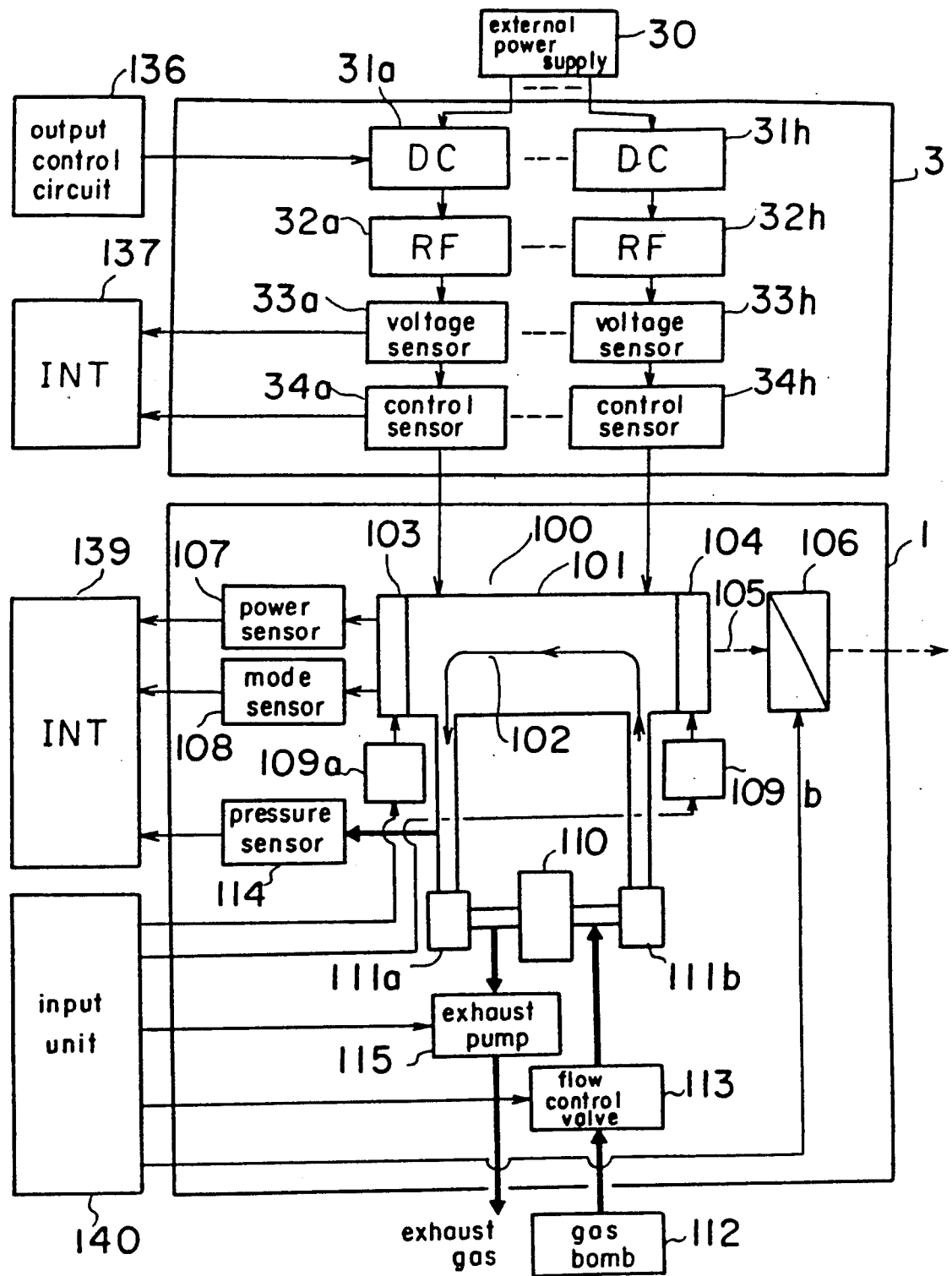
FIG. 4 is a block diagram showing details of the power supply and laser oscillator shown in FIG. 1.

FIG. 4 is a block diagram showing details of the power supply 3 and the laser oscillator 1, wherein DC power supplies 31a-31h are eight independent units each of which rectifies and filters 3 phase AC, (e.g., 200V AC supplied from an external power supply 30) and then produces a DC output through a pulse width modulator (PWM) type DC-DC converter. The output currents are individually controlled by an output control circuit 136, respectively. High frequency power supplies 32a-32h convert these DC outputs to high frequencies of 3-5KV at 2Mhz and supply the converted signals to the laser oscillator 1 through voltage sensors 33a-33h and current sensors 34a-34h. The voltage sensors 33a-33h, respectively and supply signals responsive to these measurements to the computerized numerical control system (CNC) 5 through the interface 137.

Although it is not illustrated in FIG. 4, a laser tube 101 comprises eight laser tubes coupled in series with their light axes aligned with respect to each other. Each laser tube is independently supplied with a high frequency current from the power supply 3. A laser gas 102 circulates in the inside of the laser tube 101, and when a high frequency current is supplied thereto, it causes discharge and excites the laser gas 102. A rear mirror 103 comprises a germanium (Ge) mirror with a reflectance of 99.5% and an output mirror 104 comprises a zinc selenium (ZnSe) mirror with a reflectance of 65%, and a Fabry-Perot resonator 100 is positioned between the mirrors 103 and 104. The resonator 100 amplifies a light beam of 10.6 $\mu$m emitted from the excited laser gas and outputs at least a part of this light beam as a laser beam 105 from the output mirror 104.

A shutter 106 comprises a copper plate or an aluminum plate with its surface plated. When closed, the shutter 106 reflects the laser beam 105 to a beam absorber (not shown) which absorbs the reflected beam. When the shutter 16 is opened, the laser beam 105 is emitted as shown by the dashed line in FIG. 4.

A power sensor 107, which comprises a heat-to-electric conversion element, a photo-to-electric conversion element or the like, receives a part of the laser beam 105 that passes through the rear mirror 103 and measures the output power of the laser beam 105 and applies the received part of the laser beam 105 to the computerized numerical control system (CNC) 5 through the interface 139. Likewise, a mode sensor 108 monitors the beam mode of the laser beam 105 by receiving a part of the laser beam 105 passing through the rear mirror 103 and applies this part of the laser beam 105 to the computerized numerical control system (CNC) 5 through the interface 139. When the detected beam mode exceeds an allowable limit, the processor 13 (FIG. 1) outputs an adjustment command value, and then servo motors in alignment adjusting mechanisms 109a, 109b are driven in response to the adjustment command value so that the angles of the rear mirror 103 and the output mirror 104 are automatically adjusted to bring the beam mode within an acceptable limit.

A blower 110 comprises a Roots blower and circulates the laser gas 102 through coolers 111a and 111b. The cooler 111a is used to cool the laser gas 102 which is heated by effecting laser oscillation in the laser tube 101, and the cooler 111b is used to remove compression heat caused by the blower 110.

A gas supply unit 112 comprises a gas bomb of pressure from 1 to 2 Kgf/cm$^2$. The laser gas is supplied to the resonator 100 through a flow control valve 113. The gas pressure in the resonator 100 is sensed by a pressure sensor 114 and fed back to the computerized numerical control system (CNC)5, and an exhaust pump 115 is driven in response to a command.

The shutter 106, the alignment adjusting mechanisms 109a and 109b, the flow control valve 113, the exhaust pump 115 and the like are controlled by a controller PMC 138 (FIG. 3) through an input unit 140.

Figure 5:
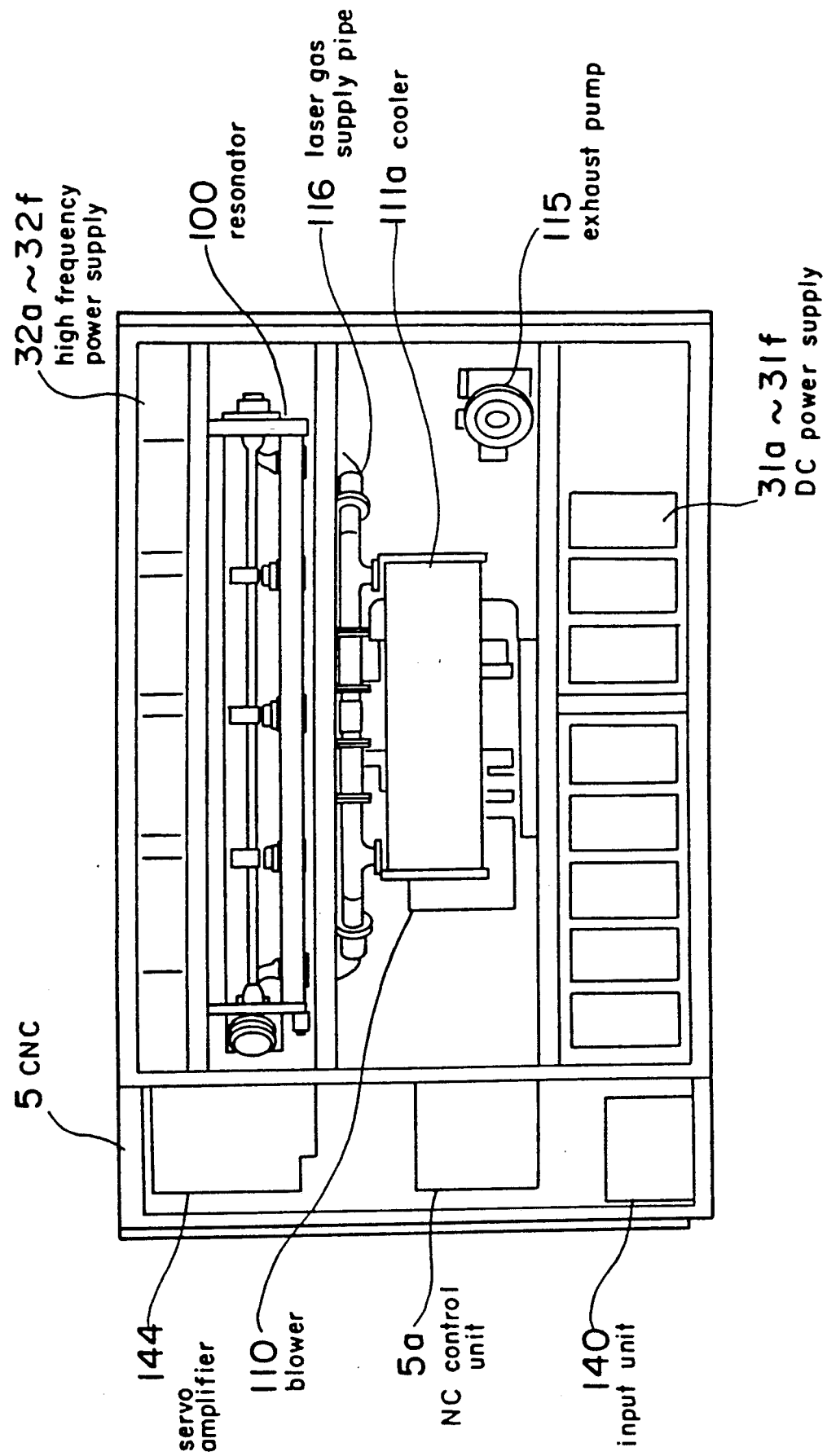
FIG. 5 is a layout of the interior of the housing for the NC laser shown in FIG. 1.

FIG. 5 is a layout diagram of the interior of a housing for the NC laser 14. Note that only leading parts of a relatively large size are shown in the figure. In FIG. 5, the high frequency power supplies 32a-32f are disposed on the uppermost right hand stage, the resonator 100 is disposed below the high frequency power supplies, and the blower 110, the cooler 111a, the cooler 111b and the exhaust pump 115 are disposed below the resonator 100 and coupled through a laser gas supply pipe 116. The DC power supplies 31a-31f are disposed on the lowermost stage.

Components of the computerized numerical control (CNC) 5 are disposed on the left hand portion of the housing; that is, the servo amplifier 144 is disposed on an upper stage, an input unit 140 is disposed on a lower stage and other NC control unit 5a is disposed on a middle stage.

Although the above describes the laser oscillator 1, the power supply and the computerized numerical control system (CNC) 5 as being in the same housing, the layout is not limited to this case. It is, however, essential that these three elements be functionally coupled without redundancy. As described above, since the computerized numerical control system (CNC) 5 comprises microprocessors in the NC laser 14, a sequence control and an output control are software-implemented in operation.

The functions which are implemented by software will be described below.

Sequence control for material processing operation

This function has heretofore been performed manually or by a programmable controller. Specifically, it includes the following:

(i) Preparations for operation such as exhausting or filling a laser medium gas;

(ii) Application and cutting off of a discharge voltage, and oscillation control by opening and closing a shutter, or the like;

(iii) Monitoring of a discharge current, a laser tube voltage, an arc current, etc., and stoppage of operation or emergency stoppage effected when these monitored parameters exceed certain values.

Output power control by setting and modifying output power conditions

This function has heretofore been difficult to perform, and in part effected manually. It can be automatically effected at a high speed in NC laser, and specifically includes the following:

(i) Control of the selection of laser tubes in which an electric discharge is to be generated. Dependent on output conditions, a certain number of tubes of a plurality of laser tubes are selected in which to produce an electric discharge actually to contribute to oscillation. Since the selection of laser tubes can freely be changed during laser oscillation by a function of an NC laser, the laser output can be controlled in a wide dynamic range of from 10W to 100W.

(ii) Control of laser gas pressure. When starting an electric discharge, the pressure is lowered to 35 Torr to lower the discharge starting voltage. After the electric discharge has been started, the pressure is raised back to 45 Torr to reduce the burden on the power supply. While not in use, the pressure in the apparatus is kept at the atmospheric pressure to prevent oil from flowing back.

(iii) Control of laser oscillation modes. During laser oscillation, the value of a continuous output is varied, the frequency and pulse rate of a pulsed output are varied, and an oscillation mode for piercing operation is varied to meet various processing requirements.

Various feedback controls

Conventionally, a dedicated control unit has been necessary for feedback control. With the NC laser 14, since the function of the CPU of the computerized numerical control system (CNC) 5 is adequate, various feedback controls can be performed without adding special hardware. These feedback controls include the following:

(i) Feedback of a laser output power. With the NC laser, the laser output is monitored at all times, while the discharge current is controlled on the preset value, so that the output power feedback can be performed by the combination of the two kinds of controls.

(ii) Control of the pressure of the laser medium gas. Since the gas pressure has a direct effect on the laser output, controlling the gas pressure results in controlling the laser output power.

(iii) Control of optic alignment. The automatic alignment of a single mirror or of the laser cavity can be performed using the output power as the monitored quantity.

Control of the work table

The work table is controlled in the same manner that the axes of a normal numerically controlled apparatus are controlled, and thus control of the work table will not be described. Inasmuch as the machining speed of a material processing apparatus is higher than the speed of normal machining operation, pulse control and the like must be processed at high speed in view of the higher processing speed.

Display of various pieces of information and interactive function

Various pieces of information are displayed on the CRT display unit of the computerized numerical control system (CNC) 5. To the display capability, there is added an interactive function for making the material processing apparatus more intelligent. The display and interactive functions include the following:

(i) Display of operating characteristics. For example, an output mode, output power, pulse parameters (i.e., frequency, pulse duration, etc.) are displayed.

(ii) Display of operating conditions. Conditions such as a laser gas pressure, the number of laser tubes in which an electric discharge is produced, and the like are displayed.

(iii) Display of maintenance and inspection instructions. For example, information as to periodic maintenance required, such as oil replacement, replacement of optical parts, and the like is displayed. The interval times for such maintenance and inspection are calculated by a timer in the computerized numerical control system (CNC) 5.

(iv) Display of an abnormal condition and instructions given to the operator. For example, a damaged area is displayed, and corrective action is displayed.

(v) The aforesaid display functions are combined with an interactive function such that the operator can input an inquiry to the computerized numerical control system (CNC) 5 and the computerized numerical control system (CNC) 5 displays an answer to the inquiry, thus lessening the burden on the operator.

With the present invention, as described above, the "NC laser" comprising the laser oscillator, the power supply, and the computerized numerical control system (CNC) which are coupled together makes the overall arrangement small in size, simple in construction, and easy to handle. Moreover, it is possible to add the new processing means by utilizing the high processing ability of the CPU in the computerized numerical control system (CNC).

In addition, the display functions are made interactive to increase the ease with which the system can be handled.

We claim:

1. A numerical control system for a laser comprising a laser oscillator for driving electric discharge laser tubes including a gas, an electric power supply for driving the laser oscillator, and a computerized numerical control system (CNC), comprising:

a housing;

sequence control means, positioned within said housing, for controlling a sequence of operation of the laser oscillator;

output power control means, positioned within said housing, for controlling output conditions of the laser oscillator including an output power of the laser oscillator;

feedback control means, positioned within said housing, for controlling the output power from the laser oscillator;

display control means, positioned within said housing, for displaying operating characteristics, operating conditions, maintenance and inspection instructions, and abnormal conditions of the laser oscillator;

table movement control means, positioned within said housing, for controlling the position and speed of a work table; and CPU means, positioned within said housing, for controlling said sequence control means, said output power control means, said feedback control means, said display control means and said table movement control means.

2. A numerical control system according to claim 1, wherein said sequence control means includes means for discharging and pressurizing the gas, for controlling a discharge voltage of the electric discharge laser tubes, for controlling laser oscillation by opening and closing a shutter, and for monitoring various control parameters so as to provide emergency stoppage and stoppage of operation based on the monitored parameters.

3. A numerical control system according to claim 1, wherein said output control means includes means for discharging selected ones of the electric discharge laser tubes, for controlling the pressure of the gas, and for controlling the laser oscillator.

4. A numerical control system according to claim 1, wherein said feedback control means includes:

means for monitoring the laser output power, for monitoring a pressure of the gas and for monitoring alignment of the laser output; and means for controlling the laser output power, the gas pressure, and output alignment respectively based on the monitored pressure, alignment and output.

5. A numerical control system according to claim 1, wherein said display control means includes means for requesting information to be provided by an operator.

* * * * *

UNITED STATES PATENT AND TRADEMARK OFFICE
CERTIFICATE OF CORRECTION

PATENT NO. : 5,065,330

DATED : November 12, 1991

INVENTOR(S) : Karube et al.

It is certified that error appears in the above-identified patent and that said Letters Patent is hereby corrected as shown below:

Col. 1, line 60, "timecon-" should be --time-con- --.

Col. 2, line 27, "in high" should be --high in--.

Col. 3, line 9, "(DRAM) a" should be --(DRAM) and--.

Col. 4, line 1, "3-5KV at 2 Mhz" should be --3-4KV at 2 Mhz--;

line 4, "33a-33h," should be --33a-33h and the current sensors 34a-34h measure the output voltages and the output currents from the high frequency power supplies 32a-32h,--;

line 28, "shutter 16" should be --shutter 106--.

Signed and Sealed this

Twentieth Day of April, 1993

Attest:

MICHAEL K. KIRK

*Attesting Officer*   *Acting Commissioner of Patents and Trademarks*